(12) United States Patent
Lenzgeiger et al.

(10) Patent No.: US 10,066,742 B2
(45) Date of Patent: Sep. 4, 2018

(54) TRANSMISSION COMBINATION, TRACTION DRIVE AND METHOD FOR CONTROLLING THE TRANSMISSION COMBINATION

(71) Applicant: Robert Bosch GmbH, Stuttgart (DE)

(72) Inventors: Ulrich Lenzgeiger, Dinkelscherben (DE); Norman Brix, Leipheim (DE); Steffen Mutschler, Neu-Ulm (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/490,006

(22) Filed: Apr. 18, 2017

(65) Prior Publication Data

US 2017/0314673 A1    Nov. 2, 2017

(30) Foreign Application Priority Data

Apr. 28, 2016 (DE) .......................... 10 2016 207 228

(51) Int. Cl.
*F16H 47/02* (2006.01)
*F16H 61/28* (2006.01)
*B60K 17/10* (2006.01)
*F16H 61/40* (2010.01)

(52) U.S. Cl.
CPC ......... *F16H 61/2807* (2013.01); *B60K 17/10* (2013.01); *F16H 47/02* (2013.01); *F16H 61/40* (2013.01); *F16D 2500/5018* (2013.01); *F16H 2047/025* (2013.01); *F16H 2061/283* (2013.01); *F16H 2342/042* (2013.01)

(58) Field of Classification Search
None
See application file for complete search history.

(56) References Cited

U.S. PATENT DOCUMENTS

| | | | | |
|---|---|---|---|---|
| 7,440,833 | B2 * | 10/2008 | Chen | F16H 61/061 477/70 |
| 9,115,772 | B2 * | 8/2015 | Dix | F16D 48/06 |
| 9,233,684 | B2 * | 1/2016 | Park | F16H 61/061 |
| 9,702,417 | B2 * | 7/2017 | Dix | F16D 48/02 |

* cited by examiner

*Primary Examiner* — Dirk Wright
(74) *Attorney, Agent, or Firm* — Maginot, Moore & Beck LLP (57) ABSTRACT

A transmission combination includes a hydrostatic transmission and a mechanical transmission having a clutch and a control device for calibrating a grinding point of the clutch. A traction drive includes the transmission combination. A method includes calibrating the clutch.

16 Claims, 3 Drawing Sheets

TRANSMISSION COMBINATION, TRACTION DRIVE AND METHOD FOR CONTROLLING THE TRANSMISSION COMBINATION

This application claims priority under 35 U.S.C. § 119 to patent application no. DE 10 2016 207 228.5, filed on Apr. 28, 2016 in Germany, the disclosure of which is incorporated herein by reference in its entirety.

BACKGROUND

The disclosure relates to a transmission combination, a traction drive therewith, and a method for calibrating a clutch of the transmission combination.

In order to increase the transmission ratio range of a traction drive, for example hydrostatic transmissions with two hydraulic motors which are operated fluidically in parallel are known. The drive shaft power thereof can be added via a compounding transmission of the hydrostatic transmission and transmitted, for example, to a vehicle axle. For example, at a low velocity both hydraulic motors are in parallel operation and therefore permit a high traction force. Given a predefined delivery quantity of the hydraulic pump and against the background that the reduction of the swept volumes of the hydraulic motors entails a decreasing efficiency level, the velocity which can be achieved with two motors is limited.

In order to obtain a driving range of a relatively high velocity, one of the hydraulic motors can therefore be set to expulsion volume zero and be disconnected from the output by means of a clutch. The entire volume flow of the hydraulic pump is therefore directed via the remaining, usually smaller hydraulic motor, which permits relatively high rotational speeds and therefore relatively high velocities.

If both hydraulic motors then contribute again to the transmission of power, the clutch must be closed. For this purpose, the hydraulic motor which is previously disconnected from the output has to be accelerated from a stationary state to its working rotational speed. This acceleration process is to take place both quickly and as far as possible without being noticed by the driver. Owing to these, to a certain extent, contradictory requirements, the control of the coupling process is demanding.

The clutch is activated, for example, by means of a hydraulic cylinder. Depending on the design, the closing of the clutch is brought about here either by the application of pressure medium to the hydraulic cylinder or by the discharging of pressure medium from the hydraulic cylinder. Charging and discharging can be referred to as supplying pressure medium.

In principle, the closing process of the clutch can be divided into two phases. In a first phase, the pressure medium is supplied in such a way that the clutch is engaged as quickly as possible, that is to say the clutch stroke is implemented as far as the grinding point in the shortest possible time. The second phase starts from the grinding point, that is to say if torque is being transmitted by the clutch. Starting from this point, the supply of pressure medium mainly only then brings about an increase in the transmissible torque of the clutch and no longer a clutch stroke.

The first phase is optimally very short in terms of time and ends in a position directly before the grinding point. The second phase is then preferably controlled in such a way that the respective hydraulic motor is accelerated in the desired gentle fashion.

The prior art discloses switching valves in combination with nozzles for supplying pressure medium to the hydraulic cylinder of the clutch and therefore for controlling the two phases. Although it is possible to map the torque profile of the clutch gently during its closing, a rapid piston movement of the hydraulic cylinder in the first phase is virtually impossible, in particular in the case of cold oil. Although in this case the supply of pressure medium is enhanced in both phases through the use of relatively large nozzles, which shortens the switching process, this also makes the switching process less comfortable.

As an alternative to switching valves, a proportional valve can be used to resolve this problematic situation. However, the grinding point then has to be known as a function of a process variable which can be saved in the transmission controller. At present, for this purpose, the grinding point is determined manually, and therefore calibrated, on a roller test stand once, before the delivery of the traction drive or the vehicle.

A disadvantage of this solution is, on the one hand, that the calibration and setting on a roller test stand is complex. In addition, owing to the natural change in the coupling characteristic due to wear the re-calibration requires a return to the roller test stand every time. Since this entails a high degree of expenditure, and therefore is frequently dispensed with, the switching comfort of such clutches is reduced markedly over the service life.

In contrast to this, the disclosure is based on the object of providing a transmission combination which can be calibrated with little expenditure, and a traction drive therewith. Furthermore, an object of the disclosure is to provide a method for controlling, in particular for calibrating, the transmission combination.

SUMMARY

The first object is achieved by means of a transmission combination having the features of the disclosure, the second object is achieved by means of a traction drive having the features of the disclosure, and the third object is achieved by means of a method having the features of the disclosure.

Advantageous developments of the transmission combination and the method are described in the dependent claims.

The hydrostatic transmission, which can be used, in particular, in a traction drive, for example as a stand-alone converter or within a power-split power train, has a hydraulic pump with an adjustable expulsion volume. The hydraulic pump can be embodied here, for example, as an axial piston pump with a swashplate design. Furthermore, the hydrostatic transmission has at least one hydraulic motor which can be supplied with pressure medium by the hydraulic pump, wherein the hydraulic pump and hydraulic motor are arranged, in particular, in a closed hydraulic circuit. If a plurality of hydraulic motors are present, they are arranged, in particular, fluidically parallel with one another. The drive shafts of the hydraulic motors can be connected to one another in a rotationally fixed fashion via a clutch of the transmission for the purpose of power compounding or torque compounding. Furthermore, a control device is provided by means of which a grinding point, that is to say an operating point from which the clutch can transmit torque, can be calibrated when the clutch closes.

According to the disclosure, the control device is configured in such a way that the grinding point of the clutch can be calibrated as a function of a response of the expulsion volume of the hydraulic pump and/or of the pressure medium volume flow of the hydraulic pump and/or of the rotational speed of at least one hydraulic motor, in particular of a rotational speed dependent on the rotational speed of at least one hydraulic motor. In particular the response is a response to the torque at the grinding point.

Compared to the solutions in the prior art in which the calibration takes place on the basis of the change in the working pressure or load pressure of the hydraulic circuit, for the purpose of calibration it is therefore possible to dispense with the detection of the working pressure or load pressure which is complex in terms of device technology and subject to errors.

The hydrostatic transmission preferably has two hydraulic motors (6, 8) which can be supplied with pressure medium by the hydraulic pump (4), the drive shafts (22, 24) of which can be connected in a rotationally fixed fashion via a clutch (38) of the transmission (2) for the purpose of power compounding, wherein the grinding point can be calibrated by means of the control device (68) as a function of a response of the expulsion volume ($V_{HP}$) or pressure medium volume flow (Q) of the hydraulic pump (4) or a rotational speed ($n_{HM2}$) of a hydraulic motor (8) of the two hydraulic motors (6, 8). The mechanical transmission can therefore be embodied in such a way that it has one or more clutches and as a compounding transmission can compound the output torques of the two hydraulic motors. In particular, the clutch or the clutches and the compounding transmission form one spatial unit.

Although the hydraulic machines have been explicitly referred to above as a hydraulic pump and hydraulic motors, it is to be noted that in the case of a reversal of load at the hydrostatic transmission, for example at the changeover from traction mode into overrun mode, the hydraulic pump can of course change into the motor mode and one or both hydraulic motors can change into the pump mode.

In one preferred development, the transmission combination has a deceleration device, in particular a parking brake, which can be controlled by the control device and by means of which at least one of the drive shafts can be arrested, in particular for the purpose of calibration.

Then, in order to calibrate the grinding point one of the drive shafts can be in a stationary state and the other of the drive shafts can be made to rotate by means of the pressure medium volume flow of the hydraulic pump.

It follows from this that a traction drive which has the transmission combination or the vehicle which has said traction drive can be stationary for the purpose of calibration. This entails the advantage that the calibration can be carried out, not on a roller test stand as previously in the prior art, but, for example, in the field, simply when the vehicle is stationary. Therefore, the calibration can be carried out frequently and comfortably. In this way, the coupling behavior or shifting behavior of the transmission combination can always be matched to the real, that is to say not purely nominal, value of the grinding point. The comfort of the shifting process can therefore be maintained despite the natural wear of the clutch.

In order to detect/determine the response, the transmission combination has, in one development, means for detecting and/or determining the expulsion volume and/or the pressure medium volume flow of the hydraulic pump. Alternatively or additionally the transmission combination has at least one rotational speed-detection unit for detecting the rotational speed of the respective hydraulic motor.

In one advantageous development, the hydraulic pump is configured in such a way that its expulsion volume changes as a function of the working pressure or load pressure of the pressure medium. In particular, in this context the working pressure or load pressure acts, insofar as it rises, on the expulsion volume of the hydraulic pump in a reducing fashion. A hydraulic pump which is configured in such a way can be referred to as "load-sensing".

In addition, the hydrostatic transmission preferably has a closed-loop control device and the hydraulic pump is configured in such a way that its expulsion volume additionally depends on a setting of this closed-loop control device. In this context, the closed-loop control device of the hydrostatic transmission acts, for example, on an adjustment device of the expulsion volume of the hydraulic pump or controls this adjustment device.

In one possible embodiment, the hydraulic pump is embodied as an axial piston machine with a swashplate design. This machine has working pistons which circulate with a drive shaft and which are supported on a swashplate which can pivot about a pivoting axle.

The swashplate is preferably connected to an adjustment device which is in particular configured as a hydraulic cylinder and is spaced apart from the pivoting axle. Control pressure medium can be applied to the hydraulic cylinder here via the closed-loop control device according to the setting thereof. A torque which acts on the swashplate results from the control pressure of the control pressure medium which acts on the piston of the adjustment device. The torque which acts on the swashplate and results from the supporting forces of the working pistons to which working pressure is applied counteracts said torque.

It proves advantageous if the control device is configured in such a way that for the purpose of calibration it can keep constant a setting of the closed-loop control device, that is to say in the specified example the control pressure. The same applies if for the purpose of calibration the control device can keep constant a rotational speed of the hydraulic pump.

In principle, the at least one hydraulic motor which is present can be respectively configured with a constant expulsion volume. If two hydraulic motors are present, both hydraulic motors can have a constant expulsion volume.

However, in one flexible development it proves advantageous if at least one of the hydraulic motors is configured with an adjustable expulsion volume. It is also advantageous here in turn if the control device is configured in such a way that said control device can be used to keep at least this one adjustable expulsion volume constant for the purpose of calibration.

In one development, the hydrostatic transmission additionally has a hydraulic cylinder with a closed-loop control device which is assigned thereto, via which hydraulic cylinder the clutch can be activated. This hydraulic cylinder has a pressure space which can either be charged with pressure medium via means of the so-called closed-loop control device or from which pressure medium can be discharged via the closed-loop control device.

In one variant, the clutch, its hydraulic cylinder and the assigned closed-loop control device are configured in such a way that the charging of pressure medium, the activation of the clutch in the closing direction and the discharging of pressure medium bring about, assisted by a spring force, the activation of the clutch in the opening direction. In another variant, the clutch, its hydraulic cylinder and the assigned closed-loop control device are configured in such a way that the charging of pressure medium, the activation of the clutch in the opening direction and the discharging of pressure medium brings about, assisted by a spring force, the activation of the clutch in the closing direction.

The closed-loop control device of the hydraulic pump or the latterly mentioned one of the hydraulic cylinder can be configured, for example, as a pressure-reducing valve or pressure-regulating valve which can be activated, in particular, electromagnetically.

A traction drive according to the disclosure has a transmission combination which is configured according to at least one of the aspects of the preceding description. In addition said traction drive has a drive machine, in particular a diesel engine, by which the hydraulic pump can be driven. In addition, the drive shaft of a single hydraulic motor which is present or the drive shafts of a plurality of hydraulic motors which are present can be or are coupled to at least one wheel or a chain or an axle of the traction drive for the purpose of transmitting torque and/or power.

The text which follows describes a method for calibrating the grinding point of the clutch of the transmission which has been described up to now.

The method is distinguished here by a step of "Calibration of the grinding point as a function of a response of the expulsion volume and/or pressure medium volume flow of the hydraulic pump and/or as a function of the rotational speed of one of the hydraulic motors". Here, the pressure or the torque of the motor which drives the hydraulic pump, for example a diesel engine, could also be considered to be a response. The advantage corresponds here to that which has already been explained with respect to the configuration of the control device of the hydrostatic transmission.

In one preferred development of the transmission combination and of the traction drive which has the latter, the method for execution is saved in the mentioned control device. For this purpose, the control device preferably has a memory unit and a processor unit.

As already mentioned, the calibration proves particularly process-reliable and precise if during said calibration the rotational speed of the hydraulic pump and the expulsion volume of the hydraulic motor which is present or the expulsion volumes of the hydraulics motors which are present can be at least temporarily kept constant, in particular by means of the control device.

In one further development of the method the step "Calibrating the grinding point as a function of the response of the expulsion volume and/or of the pressure medium volume flow of the hydraulic pump and/or as a function of the rotational speed of a hydraulic motor" comprises the following steps "Continuous detection and/or determination of the expulsion volume or pressure medium volume flow of the hydraulic pump and/or the rotational speed of the hydraulic motor", "Activation of the clutch in the closing direction with a control signal starting value", "Changing the control signal value in order to increase a closing force of the clutch", "Aborting in the case of a control signal value at which a significant response is detected", and "Storing this control signal value as a control signal value at the grinding point in the control device".

If the rotational speed of the hydraulic pump and the expulsion volumes of the hydraulic motors are kept constant, it proves particularly simple in terms of device and measuring technology to detect the rotational speed of the one of the hydraulic motors as a response at the grinding point for the purpose of calibration. This process variable can be detected with only a low degree of outlay on device technology, specifically with a rotational-speed-detection unit.

A response is categorized here as significant if, for example in the case of the detected rotational speed of the one hydraulic motor, a change in rotational speed, in particular a decrease in the rotational speed or a reduction in the rotational speed is at least twice as large as a noise of the detected rotational speed signal.

As already mentioned, the calibration proves to be simple and practical if, in one development of the method, a step "Securing the drive shaft of the other of the hydraulic motors" takes place before the step "Changing the control signal value". In this context, that drive shaft which can or is connected in any case with a relatively high priority—or even fixedly—to a wheel or a chain or some other output of the traction drive is particularly advantageous.

This drive shaft can be secured, for example, by means of a parking brake or vehicle brake. The closing or activation of the clutch in the closing direction then brings about in response a reduction of the rotational speed of the one of the hydraulic motors at the grinding point.

In principle, a load pressure or working pressure of the hydraulic pump which supplies the hydraulic motor with pressure medium results from the torque of a hydraulic motor, occurring at the grinding point, as a function of the expulsion volume set by said hydraulic motor. The lower the expulsion volume of this hydraulic motor here, the greater the load pressure or working pressure resulting from the torque. The higher this pressure, in other words the greater the change in the load pressure or working pressure resulting from the torque, the stronger the force which acts in a reducing fashion on the expulsion volume of the hydraulic pump as a result. The change in the expulsion volume of the hydraulic pump, and therefore the change in the pressure medium volume flow of the hydraulic pump in proportion therewith, then turn out to be all the larger. Finally, the change in the rotational speed of the hydraulic motor is then also of maximum magnitude.

An expulsion volume of the hydraulic motor which is set to a lower setting therefore gives rise to an all the stronger response of the rotational speed of this hydraulic motor than in the case of a large expulsion volume of this hydraulic motor. In one development, before the step "Changing the control signal value" there is therefore a step "Reducing the expulsion volume of the hydraulic motor", in particular to a value between 5% and 50%, in particular preferably to approximately 20%.

In one variant of the method, the step "Changing the control signal value" takes place continuously, that is to say in a continuous and uninterrupted fashion in the course of time. In another variant, the step "Changing the control signal value" takes place incrementally, i.e. in successive incremental increases in the control signal value.

In order to assist calibration at the grinding point not only to precisely one control signal value at the grinding point, a development of the method has at least one repetition of the abovementioned step sequence "Continuous detection", "Activation of the clutch", "Changing the control signal value", Aborting" and "Saving". However, in this context each repetition occurs with a new control signal starting value.

This control signal starting value is newly set each time before the step "Activation of the clutch in the closing direction with the control signal starting value" by means of a step "Setting the new control signal starting value as a function of the most recently saved control signal value at the grinding point". In this way, the time period which is required for the step "Changing the control signal value" up to the step "Aborting", and therefore the time for the calibration, can be shortened.

Before each repetition of the step sequence, a step "Releasing or opening the clutch" preferably takes place here, in particular by means of the control device.

In one development, the control signal starting value is calculated in the step "Setting the new control signal starting value as a function of the most recently saved control signal value at the grinding point" from the most recently saved control signal value at the grinding point, reduced by at least one of the following values: an increment of the control signal value of the previous step sequence, a fraction of the increment or a multiple of the increment; a hysteresis of the control signal value; a predetermined tolerance value. In this way, it is ensured, inter alia, that the calibration process starts in an opened state of the clutch as a starting value.

One development of the disclosure having at least one repetition of the specified step sequence has additionally a step "Determining a mean value from the saved control signal values at the grinding point". As a result, the control signal value which is ultimately calibrated at the grinding point is supported on a wider database.

In order to improve the quality of the calibration further, in one development the method can contain a step "Determining control signal values at the grinding point which lie outside a specified bandwidth or a standard deviation". In this context, this step is followed by a step "Exclusion of control signal values at the grinding point from the mean value formation which lie outside the bandwidth or standard deviation", or a step "Rejection of the previous control signal values at the grinding point and repetition of the method".

BRIEF DESCRIPTION OF THE DRAWINGS

An exemplary embodiment of a traction drive according to the disclosure with a transmission combination according to the disclosure as well as diagrams of an exemplary embodiment of a driving according to the disclosure are illustrated in the drawings. The disclosure will now be explained in more detail on the basis of the figures of these drawings.

In the drawings.

DETAILED DESCRIPTION

Figure 1:
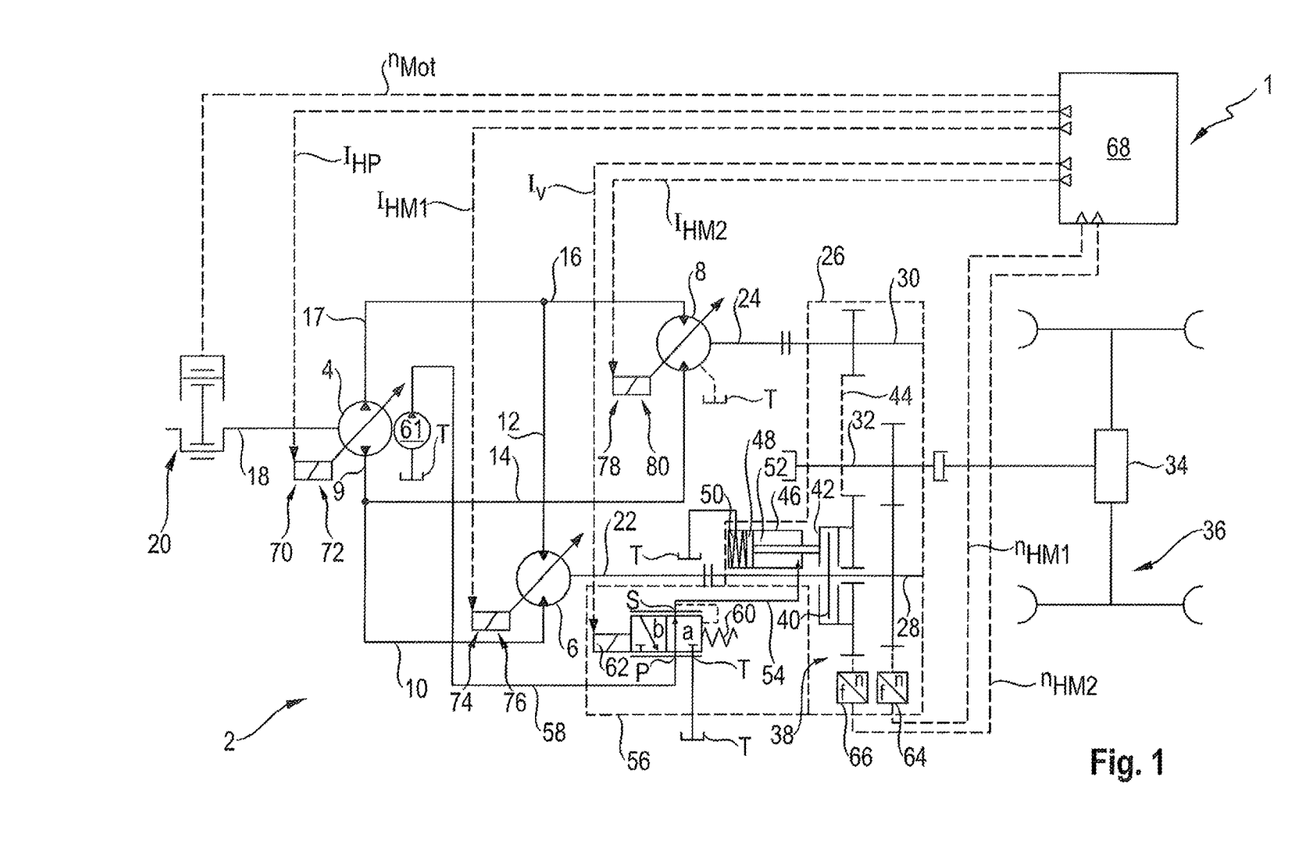
FIG. 1 shows an exemplary embodiment of a traction drive having the transmission combination in a schematic illustration.

According to FIG. 1, a traction drive 1 has a hydrostatic transmission 2 with a hydraulic machine 4 which operates as a hydraulic pump in the traction mode of the traction drive 1 and two hydraulic machines 6 and 8 which operate as hydraulic motors in the specified traction mode. The two hydraulic motors 6, 8 are connected, on the one hand, to the hydraulic pump 4 via working lines 10 and 12, and, on the other hand, 14 and 16 fluidically in parallel in a closed hydraulic circuit. The hydraulic machines 4, 6, 8 can be adjusted in their expulsion volume, while they are each embodied as an axial piston machine with a swashplate design or/axle design.

The hydraulic pump 4 is connected via its drive shaft 18 to a drive machine 20 which is configured as a diesel engine. A first hydraulic motor 6 of the two hydraulic motors 6, 8 has a first drive shaft 22, and the second hydraulic motor 8 has a second drive shaft 24. A compounding transmission 26 with two input shafts 28 and 30 is connected downstream of the hydrostatic transmission 2 as a mechanical transmission. The first input shaft 28 is connected here in a rotationally fixed manner to the first drive shaft 22, and the second input shaft 30 is connected in a rotationally fixed fashion to the second drive shaft 24. An output shaft 32 of the compounding transmission 26 is connected in a rotationally fixed fashion to a differential 34 of a drive axle 36.

The compounding transmission 36 comprises a clutch 38 which is embodied as a multi-disk clutch. The latter has a first clutch section 30 which is connected in a rotationally fixed fashion to the first input shaft 28. It additionally has a second clutch section 42 which is connected in a rotationally fixed fashion via a gearwheel arrangement 44 (illustrated only schematically) to the second input shaft 30 of the compounding transmission 26. By activating the clutch 38, which involves engagement of the second clutch section 42, the two input shafts 28 and 30 therefore the two drive shafts 22 and 24 can be connected to one another in a rotationally fixed fashion.

An activation element 46, which is configured as a hydraulic cylinder, is provided for activating the clutch 38. The piston 48 of said activation element 46 is coupled in a tension-resistant and shear-resistant fashion via a piston rod to the second clutch section 42. The hydraulic cylinder 46 has a piston space in which a compression spring 50 is arranged. The piston space is connected here permanently to a fuel tank T via a fuel tank line. On the piston rod side, the hydraulic cylinder 46 has an annular space 52 which is connected via a control pressure line 54 to a connection S of a closed-loop control device 56 which is embodied as a pressure-regulating valve. Said closed-loop control device 56 has a pressure connection P which is connected via a pressure line 58 to a feed pump 61 which is driven, together with the hydraulic pump 4, by the drive shaft 18. The feed pump 61 sucks in pressure medium from the fuel tank T. Furthermore, the pressure-regulating valve 56 has a fuel tank connection T which is connected to the fuel tank T. The pressure-regulating valve 56 is continuously adjustable and has two end positions a, b. In a first end position a, in which the valve body is pre-loaded by means of a spring 60, the pressure connection P is connected to the control pressure connection S, and the connection T is shut off with respect to the connection S. The pressure-regulating valve 56, to be more precise its valve body can be activated into a second end position b via an electromagnet 62. During the energization of the latter, and if the second end position P is completely occupied, the control pressure connection S is connected to the fuel tank connection T, and the pressure connection P is shut off. In the first end position a, charging or filling of the angular space 52 with pressure medium takes place exclusively, whereas in the second end position b exclusively emptying or discharging of pressure medium from the annular space 52 takes place. Regulating positions of the valve body are therefore possible in the two end positions a and b, in which regulating positions the connections P, S and T have a respective pressure medium connection to one another. In order to feed back the control pressure in the annular space 52, which is to be regulated and is present at the control pressure connection S, the annular space 52 is fluidically connected via a control line or a control duct to a control face of the valve body of the pressure-regulating valve 56, which is equivalent to the spring 60.

The mechanical transmission 26 also has a first rotational speed-detection unit 64 via which the rotational speed of the first input shaft 28 and therefore the first clutch section 40 and of the first drive shaft 22 can be detected. The rotational speed of the second clutch section 42 can be detected via a second rotational speed-detection unit 66 of the mechanical transmission 26, and therefore indirectly the rotational speed of the second input shaft 30 and of the second drive shaft 24 can be detected, given knowledge of the transmission ratio of the gearwheel arrangement 44.

A closed-loop control device 70, which interacts with an adjustment device 72 to adjust the expulsion volume of the hydraulic pump 4, is assigned to the hydraulic pump 4. The first hydraulic motor 6 and the second hydraulic motor 8 have a closed-loop control device 74 or 78 and an adjustment device 76 or 80.

The drive machine 20, the closed-loop control devices 70, 74 and 78, the solenoid 62 and the rotational speed-detection units 64, 66 are each connected to the control device 68 via a signal line.

Figure 2:
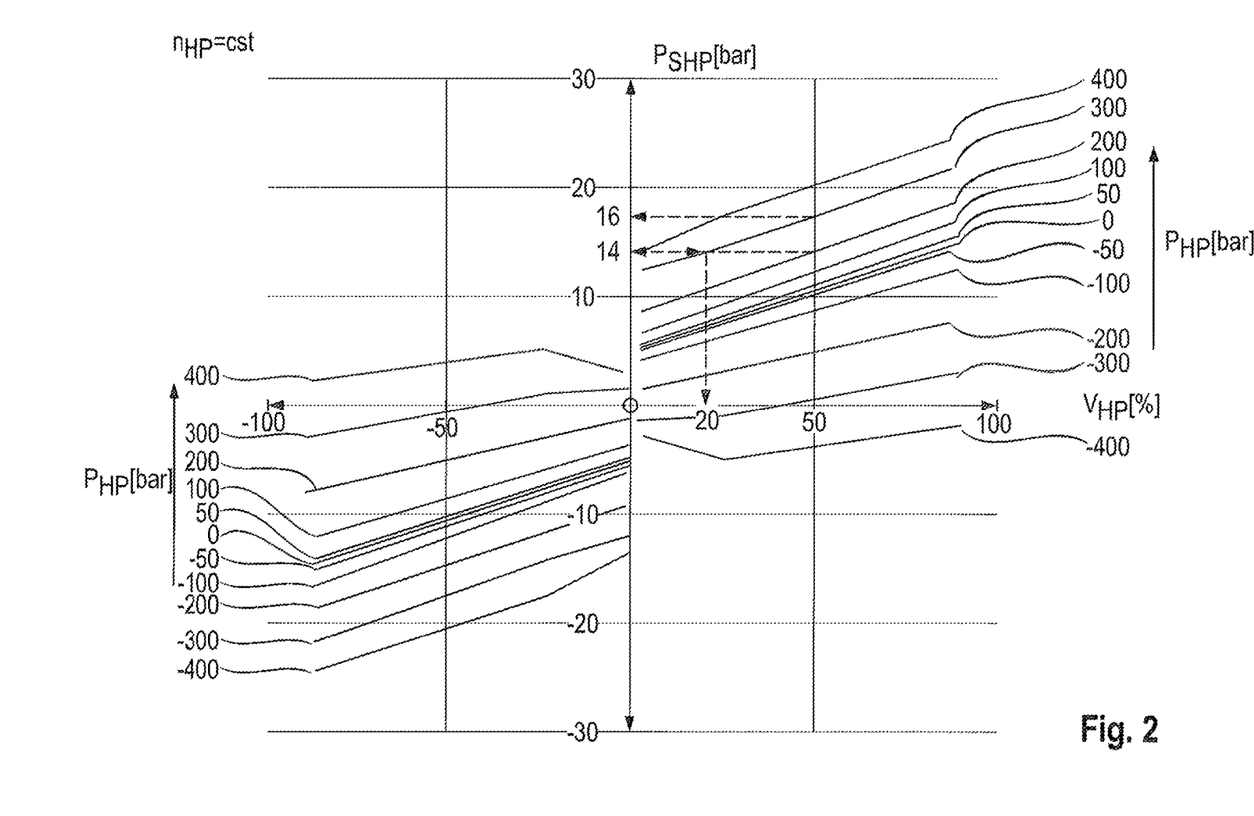
FIG. 2 shows a characteristic diagram of a hydraulic pump of the traction drive according to FIG. 1.

FIG. 2 shows a characteristic diagram of the hydraulic machine 4 which is configured as a hydraulic pump. The relationship between the pumping pressure or working pressure $p_{HP}$, a control pressure $p_{SHP}$ which is applied by the closed-loop control device 70 and acts on the adjustment device 72 of the hydraulic pump 4 and the specific expulsion volume $v_{HP}$, resulting as a function of the specified pressures $p_{HP}$, $p_{SHP}$ of the hydraulic pump 4 are illustrated therein. The working pressure $p_{HP}$ varies here between −400 bar and +400 bar, and the expulsion volume varies between 0% and approximately 90%.

Since the hydraulic pump 4 is configured with a fully pivotable swashplate, specific expulsion volumes of +90% to −90% are covered. The positive values correspond here to a positive pivoting angle of less than 0° and the negative to a negative pivoting angle of above 0°.

It is characteristic of the already mentioned "load-sensitive" behavior of the hydraulic pump 4 that the control pressure $p_{SHP}$ acts in the direction of a deflection of the swashplate from its 0° position, whereas the working pressure or pump pressure $p_{HP}$ which is present in one of the working lines 9 or 17 is effective in the direction of the resetting of the swashplate toward the pivoting angle 0°. If the group of curves of the working pressure or pump pressure $p_{HP}$ is considered, their non-linear and discontinuous profile is apparent. The discontinuity is due to the fact that in addition to the adjustment force of the adjustment device 72 which results from the control pressure $p_{SHP}$ and the supporting force resulting from the working pressure $p_{HP}$ the working piston on the swashplate also acts on a spring packet on the swashplate which centers the swashplate in its zero position.

The diagram according to FIG. 2 is valid for a rotational speed, constituting the exemplary embodiment shown, of 2000 rpm of the hydraulic pump 4. This characteristic diagram and further rotational-speed-dependent characteristic diagrams of the same type are saved in the control device 68.

If, for example, a rotational speed of the drive machine 20 of 2000 rpm is predefined by means of the control device 68, the diagram according to FIG. 2 applies. For the explanation thereof, it is assumed that owing to the load situation at the differential 34 and therefore at the transmission output shaft 32 the working pressure $p_{HP}$ of 200 bar is present in the working line 9 or 17. In addition it is to be assumed that the pivoting angle of the hydraulic pump 4 is in the positive range between 0 and 100%. Irrespective of whether just one of the hydraulic motors 6, 8 or both contribute to the drive power of the transmission output shaft 32, it is to be assumed that the swept volume of the hydraulic motor or motors 6, 8 is constant. According to the curve of the working pressure $p_{HP}$ for 200 bar, which extends on the right in the quadrant I in FIG. 2, it is then possible to read off directly which control pressure $p_{SHP}$ the pressure-regulating valve 70 of the hydraulic pump 4 has to comply in order, for example, to achieve a specific expulsion volume of the hydraulic pump 4 of 50%. In the specified example, this is approximately 14 bar. Correspondingly, the closed-loop control device 70 is then energized via the control device 68, for example with a control signal value $I_{HP}$.

It will now be assumed, with otherwise constant operational variables, that the load at the transmission output shaft 32 rises in such a way that the load pressure $p_{HP}$ rises from 200 to 300 bar. If the control pressure of 14 bar were to be maintained, this would bring about, according to FIG. 2 on the basis of the 300 bar line in the first quadrant, a reduction in the expulsion volume of 50% to approximately 20%, which would be equivalent to a corresponding decrease in the output rotational speed of the hydraulic motor or motors 6, 8 and therefore to a drop in velocity of the traction drive 1.

In order, on the other hand, to maintain the expulsion volume of 50%, with the specified change in load to 300 bar according to FIG. 2 an increase in the control pressure from 14 to 16 bar is necessary (cf. top dashed curve in FIG. 2).

As mentioned, such a behavior of the hydraulic machine 4 which is configured as a hydraulic pump is also referred to as "load-sensing". This means, in principle, that the expulsion volume or delivery volume VHP of the hydraulic pump 4 changes as a function of the working pressure or pump pressure $p_{HP}$ with otherwise constant setting of the closed-loop control device/of the pressure-regulating valve 70 ($p_{SHP}$). The hydraulic pump 4 which is configured in such a way therefore has the property that the rotational speed or the rotational speeds of the hydraulic motor or motors 6, 8 cannot be predefined rigidly, since the expulsion volume of the hydraulic pump 4 results from the above-mentioned equilibrium of the control pressure $p_{SHP}$ and working pressure $p_{HP}$. This characteristic is utilized beneficially for the method for calibrating the grinding point of the clutch 38.

Figure 3:
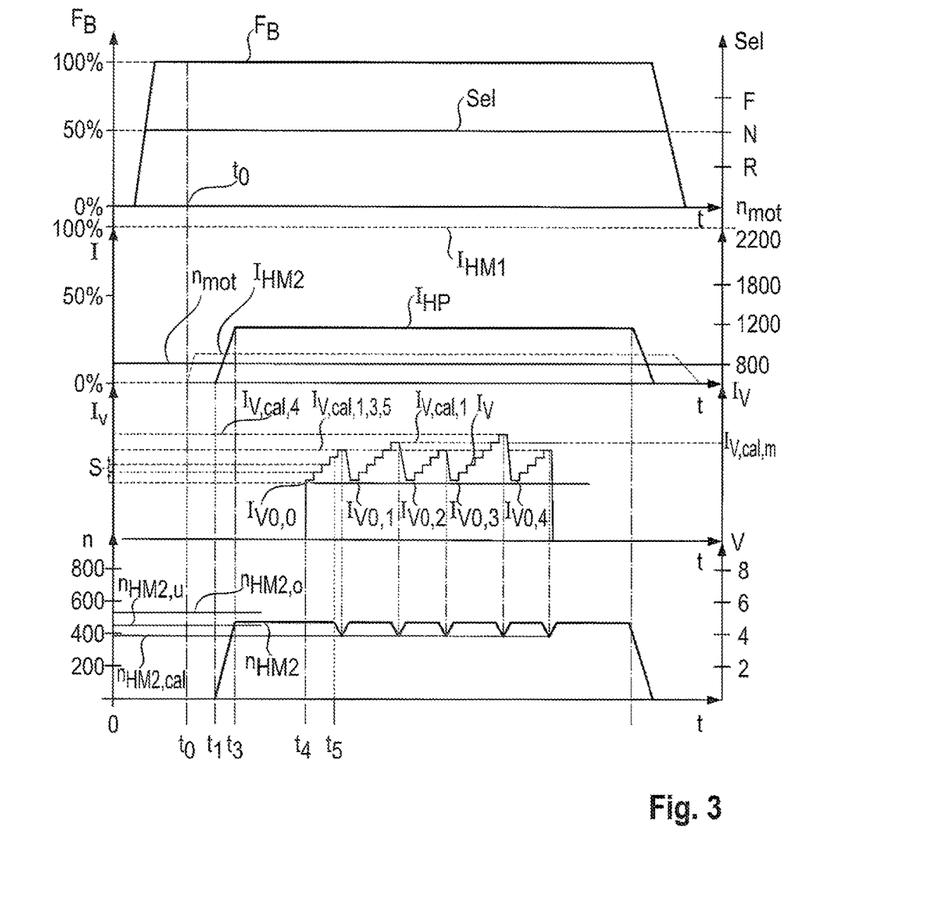
FIG. 3 shows time profiles of activation variables of the transmission combination according to FIGS. 1 and 2, during a method for calibrating the grinding point of a clutch of the transmission combination.

FIG. 3 shows the time profile of relevant operational variables of the traction drive 1 during a calibration method according to the disclosure for determining the grinding point of the clutch 38 according to FIG. 1. The time t is plotted from left to right in FIG. 3. In an upper quarter of the diagram, on the one hand the profile of the breaking force $F_B$ of a parking brake of the traction drive 1 is shown between 0-100% (not shown in FIG. 1). Furthermore, the upper quarter shows the selected value of the direction-of-travel lever with F for forward travel, R for reverse travel and N for neutral. When reverse travel F is selected, the expulsion volume $V_{HP}$ is deflected here from 0 generally in the positive direction, whereas when the reverse travel R is selected deflection generally takes place in the negative direction. In contrast, when neutral N is selected, any accelerator pedal request of an operator is ignored, with the result that the expulsion volume $V_{HP}$ cannot be influenced by the activation of the accelerator pedal. This is a necessary precondition for the fact that the calibration process remains uninfluenced by any random activation by the accelerator pedal by the operator.

In the fourth quarter in FIG. 3 from the top, control signal values $I_{HM1}$ and $I_{HM2}$ of the closed-loop control devices 74 and 78 of the two hydraulic motors 6 and 8 are illustrated. Furthermore, the control signal value $I_{HP}$ of the closed-loop control device 70 of the hydraulic pump 4 is illustrated. All three specified control signal values are illustrated here as currents I between 0% and 100% on the basis of the electromagnetic activation of the closed-loop control devices 70, 74 and 78. In the same diagram the rotational speed $n_{mot}$ of the drive machine 20 can be read off on the right, said rotational speed $n_{mot}$ being, for example, 800 rpm during the calibration.

In the third quarter of the diagram according to FIG. 3, the profile of the control signal value $I_V$ for the energization of the solenoid 62 of the pressure-regulating valve 56 is illustrated. This control signal value $I_V$ represents here the input signal during the calibration method.

In the fourth, bottom section of the diagram according to FIG. 3, the profile of the rotational speed $n_{HM2}$ of the second hydraulic motor 8 according to FIG. 1 is illustrated as a (system) response to the input signal $I_V$.

The traction drive 1 according to FIG. 1 is outside a roller test stand in the normal driving mode. Owing to a regular maintenance cycle or if the operator of the traction drive 1 has the impression that recalibration of the clutch 38 is necessary, the driver/operator can initialize the calibration by means of the control device 68. For this purpose, according to FIG. 3 the parking brake of the traction drive 1, by means of which the axle 36 according to FIG. 1 can be arrested, must firstly be set in preparation to a sufficiently large braking force $F_B$. The setting is set advantageously to the neutral value N in order to calibrate the direction of travel lever.

The calibration function is then selected by the operator. In contrast to the exemplary embodiment shown, the braking force $F_B$ and the neutral value N of the direction of travel lever can also be set in an automated fashion, for example by means of the selection of the calibration function.

In the diagram according to FIG. 3, the selection of the calibration function is at the time $t_0$. This signal involves the control device 68 setting the expulsion volume $V_{HM1}$ of the first hydraulic motor 6 to its maximum value of 100% by means of a maximum control signal value $I_{HM1}$ which is transmitted to the closed-loop control device 74. At the same time, the closed-loop control device 78 of the second hydraulic motor 8 receives a control signal value $I_{HM2}$ of approximately 20% from the control device 68, with the result that the expulsion volume $V_{HM2}$ thereof rises to approximately 20%. With the control signal value $n_{Mot}$ the control device 68 adjusts the rotational speed $n_{Mot}$ of the drive machine 20 constantly to approximately 800 rpm. Shortly after the time $t_0$ the traction drive 1 is therefore in the stationary state with a braking force $F_B$ of the parking brake of approximately 90%, the direction of travel switch in the neutral position N, an expulsion volume $V_{HM1}$ of the first hydraulic motor 6 of 100%, a rotational speed $n_{Mot}$ of the drive machine 20 and of the hydraulic pump 4 of 800 rpm. A control signal value $I_{HP}$ is still 0% at the time just after $t_0$. This means that the closed-loop control device 70 of the first hydraulic pump 4 does not control the adjustment device 72, and the swashplate is in its zero position at a pivoting angle of 0°, that is to say $V_{HP}=0$. Accordingly, a pressure medium volume flow Q of the hydraulic pump 4 is also zero. This also entails the fact that the hydraulic motors 6, 8 are stationary despite their already set expulsion volumes of $V_{HM1}=100\%$ and $V_{HM2}$ of 20%. Accordingly, the rotational speed-detection units 64, 66 also detect a rotational speed of 0.

Starting from a time $t_1$, the expulsion volume $V_{HP}$ of the hydraulic pump 4 is then increased by increasing the control signal value $I_{HP}$ up to the time $t_3$. The expulsion volume $V_{HP}$ then has a value of approximately 40% of its maximum. It is also apparent here from FIG. 3 that the rotational speed $n_{HM2}$ of the second hydraulic machine 8 rises in parallel with the increasing of the expulsion volume $V_{HP}$.

At the time $t_3$ the entire traction drive 1 is in a stationary state which is necessary for the calibration. At the time $t_3$ the control signal value $I_V$ for the pressure-regulating valve 56 is equal to 0. That is to say the solenoid 62 according to FIG. 1 is non-energized, as a result of which the pressure-regulating valve 56 is prestressed into its first end position a by means of the spring 60. Accordingly, pressure medium is applied to the annular space 52 via the feed pump 61, for which reason the second clutch section 42 is disengaged.

In the text which follows, according to the disclosure the grinding point of the clutch 38 is determined by means of the control device 68 as a function of a response of the rotational speed $n_{HM2}$ of the second hydraulic motor 8 to the control signal value $I_V$ with which the closing force of the clutch 38 is increased. According to FIG. 3, for this purpose at the time $t_4$ the control signal value $I_V$ is set to a starting value $I_{V0,0}$ and the solenoid 62 is energized. This energization is equivalent to the start of a regulating mode of the pressure-regulating valve 56, since now the signal value $I_{V0,0}$ acts on the one side of its valve body and the pressure equivalent of the spring 60 and the pressure at the control pressure connection S act on the other side. A regulating position of the pressure-regulating valve 56 between the two end positions a and b is therefore obtained, as a result of which pressure medium is relieved from the annular space 52 to the fuel tank T via the connection S and the connection T. Accordingly, the piston 48 is retracted, moved by the spring 50, in the direction of the grinding point. The starting valve $I_{V0,0}$ is selected here to be below an estimated value at the grinding point, with the result that the latter still cannot be reached at this control signal value. For this reason, subsequently an incremental increase in the control signal value $I_V$ with an increment size of s according to FIG. 3 occurs. Approximately at time $t_5$, the two clutch sections 40 and 42 according to FIG. 1 then enter into frictional engagement, with the result that a torque $M_{HM2}$, albeit only a small one, is transmitted.

The torque $M_{HM2}$ at the second drive shaft 24 is calculated from the product of the working pressure $p_{HP}$ of the hydraulic pump 4 and the expulsion volume $V_{HM2}$ of the second hydraulic motor 8. A relatively high working pressure $p_{HP}$ therefore results from the frictional engagement of the two clutch sections 40, 42 owing to the expulsion volume $V_{HM2}$, set to a constant value, of the second hydraulic motor 8 (proportional to $I_{HM2}$). However, according to FIG. 3 the closed-loop control device 70 of the hydraulic pump 4 continues to be energized with the constant control signal value $I_{HP}$, and the resulting control pressure $P_{SHP}$ of the adjustment device 72 therefore also remains constant. However, as is shown on the basis of the explanation according to FIG. 2, a control pressure $p_{SHP}$ which remains constant as the working pressure $p_{HP}$ rises brings about a reduction in the expulsion volume $V_{HP}$ of the hydraulic pump 4. Accordingly, when the rotational speed $n_{HP}$ remains the same, the pressure medium volume flow Q thereof drops, which subsequently leads to a reduction in the resulting rotational speed $n_{HM2}$ of the second hydraulic motor 2, according to FIG. 2.

If this reduction in the rotational speed of the second hydraulic motor 8 reaches a significant value at which the reduction in the rotational speed is greater than the noise of the detection signal of the rotational speed $n_{HM2}$ by at least a factor of 2, the control signal value $I_V$ which is then present is saved as a control signal value at the grinding point $I_{V,cal1}$ in the control device 68.

With this first calibration step, the calibration could be terminated since it is now known for a known input signal $I_{V,cal1}$ that the two clutch sections 40, 42 have entered into frictional engagement near to the grinding point. However, it proves advantageous to repeat the step sequence carried out in this way for the purpose of calibration. This is shown by FIG. 3, according to which the described step sequence is repeated four times with respectively newly calculated starting values $I_{V0,1\ to\ 4}$. The respectively following starting value of the control signal $I_{V0,i}$ is for this purpose calibrated by means of the control device 68 from the previous control signal value at the grinding point $I_{v,cal,i}$, reduced by the step s, a valve hysteresis of the pressure-regulating valve 56 and a tolerance value. An exemplary value for the step s is then 20 mA, for the valve hysteresis 30 mA and for the tolerance value 10 mA.

In the exemplary embodiment of the method, after five step sequences with five determined control signal values at the grinding point $I_{v,cal,1-5}$, the mean value thereof is calculated as $I_{v,cal,m}$. The calibration ends with the resetting of the values $F_B$, $I_{HP}$, $I_{HM2}$, $I_V$ to their output values 0 by means of the control device 68.

In the exemplary embodiment (illustrated in FIG. 1) of a transmission combination according to the disclosure, the hydrostatic transmission has two hydraulic motors and the mechanical transmission has, apart from various gearwheels and other elements, a single clutch. Of the two hydraulic motors, the one hydraulic motor is continuously operationally connected to the output shaft 32, while the other hydraulic motor is connected to the output shaft only when the clutch is closed.

A transmission combination according to the disclosure can also comprise a hydrostatic transmission with a different number of hydraulic motors or a mechanical transmission with a different number of clutches. It is therefore possible, for example, for the hydrostatic transmission to comprise two hydraulic motors and for the mechanical transmission to comprise three clutches, wherein when the clutches 1 and 2 are closed both hydraulic motors are operationally connected to an output shaft, and when the clutch 2 is closed only the one of the two hydraulic motors is connected to the output shaft, and when the clutch 3 is closed the other of the two hydraulic motors is operationally connected to the output shaft with a different down step ratio than when the clutch 1 is closed.

It is also conceivable that just a single hydraulic motor is present, by which a sun gear of a planetary gear mechanism can be driven. The planetary gear mechanism also comprises a planetary carrier with planetary gears and a ring gear. The ring gear can be connected in a rotationally fixed fashion to the sun gear via a clutch or in a rotationally fixed fashion to a frame via a further clutch. Depending on which clutch is closed, the down step ratio from the drive shaft of the hydraulic motor to the shaft of the planetary carrier is different.

In this context, it is to be noted that an arrangement which can be activated and which can connect a rotatable element in a fixed fashion to a frame or housing and therefore can be stationary with respect to the frame is generally referred to as a brake. The term clutch which is used in the description is also intended to comprise such arrangements which are generally referred to as a brake.

A transmission combination is disclosed having a hydrostatic transmission which has a hydraulic pump with an adjustable expulsion volume and with at least one hydraulic motor which can be supplied with pressure medium by the hydraulic pump, and with a mechanical transmission which is combined with the hydrostatic transmission and has a clutch. A control device of the transmission combination is configured here in such a way that it can be used to determine a grinding point of the clutch as a function of the response of an, in particular, kinetic, operational variable of the transmission, dependent on the expulsion volume of the hydraulic pump, to a torque at the grinding point. The kinetic operational variable can be, in particular, the pressure medium volume flow of the hydraulic pump or a rotational speed which is dependent thereon. The response of the expulsion volume of the hydraulic pump itself can also be used as an operational variable for this purpose.

Furthermore, a traction drive and a vehicle, in particular a mobile working machine, with such a transmission combination are disclosed.

Furthermore, a method for calibrating the transmission combination with a step in which the grinding point of the clutch is determined as a function of the response of the, in particular kinetic, operational variable of the transmission, dependent on the expulsion volume of the hydraulic pump, to the torque which occurs at the grinding point is disclosed.

LIST OF REFERENCE SYMBOLS

1 Hydrostatic traction drive
2 Hydrostatic transmission
4 Hydraulic pump
6 First hydraulic motor
8 Second hydraulic motor
10, 12, 14, 16 Working line
18 Driveshaft
20 Drive machine
22 First driveshaft
24 Second driveshaft
26 Compounding transmission
28 First input shaft
30 Second input shaft
32 Output shaft
34 Differential
36 Drive axle
38 Clutch
40 First clutch section
42 Second clutch section
44 Gearwheel arrangement
46 Hydraulic cylinder
48 Piston
50 Spring
52 Annular space
54 Control pressure line
56 Pressure-regulating valve
58 Pressure line
60 Spring
61 Feed-in pump
62 Solenoid
64 First rotational speed-detection unit
66 Second rotational speed-detection unit
68 Control device 70 Closed-loop control device hydraulic pump
72 Adjustment device hydraulic pump
74 Closed-loop control device first hydraulic motor
76 Adjustment device first hydraulic motor
78 Closed-loop control device second hydraulic motor
80 Adjustment device second hydraulic motor
$F_B$ Force brake pedal
F Forward travel
N Neutral
R Reverse travel
$I_{HP}$ Control signal value hydraulic pump
$I_{HM1}$ Control signal value first hydraulic motor
$I_{HM2}$ Control signal value second hydraulic motor
$n_{mot}$ Rotational speed drive machine
$I_V$ Control signal value clutch
$I_{V0}$ Control signal starting value
$I_{V0,i}$ Control signal starting value calculated
$I_{V,cal}$ Control signal value at grinding point
$n_{V,cal,m}$ Mean value control signal value at grinding point
$n_{HM1}$ Rotational speed of first hydraulic motor
$n_{HM2}$ Rotational speed of second hydraulic motor
$n_{HM2,cal}$ Rotational speed of second hydraulic motor at grinding point
P Pressure connection
S Control pressure connection
T Fuel tank connection

What is claimed is:

1. A transmission combination, comprising:
a hydrostatic transmission that has a hydraulic pump with an adjustable expulsion volume and with at least one hydraulic motor that is configured to be supplied with pressure medium by the hydraulic pump;
a mechanical transmission that is combined with the hydrostatic transmission and has a clutch; and
a control device configured to calibrate a grinding point which occurs when the clutch closes, from which time torque is configured to be transmitted via the clutch,
wherein the grinding point is configured to be calibrated by the control device as a function of a response of the expulsion volume or pressure medium volume flow of the hydraulic pump or a rotational speed of the hydraulic motor.

2. The transmission combination according to claim 1, wherein:
the at least one hydraulic motor is two hydraulic motors that are configured to be supplied with pressure medium via the hydraulic pump, the drive shafts of which are configured to be connected in a rotationally fixed fashion via a clutch of the transmission for the purpose of power compounding, and
the grinding point is configured to be calibrated by the control device as a function of a response of the expulsion volume or pressure medium volume flow of the hydraulic pump or a rotational speed of a hydraulic motor of the two hydraulic motors.

3. The transmission combination according to claim 1, wherein the hydraulic pump is configured such that the expulsion volume depends on a setting of a closed-loop control device of the hydrostatic transmission and on a working pressure of the pressure medium.

4. The transmission combination according to claim 1, wherein a setting of a closed-loop control device is configured to be kept constant by the control device for the purpose of calibration.

5. The transmission combination according to claim 1, wherein a rotational speed of the hydraulic pump is configured to be kept constant by the control device for the purpose of calibration.

6. The transmission combination according to claim 1, wherein the hydraulic motor is configured with an adjustable expulsion volume or with a constant expulsion volume, and wherein the expulsion volume of the hydraulic motor is configured to be kept constant by the control device or is constant for the purpose of calibration.

7. A method for calibrating a grinding point of a transmission, the transmission including a hydrostatic transmission that has a hydraulic pump with an adjustable expulsion volume and with at least one hydraulic motor that is configured to be supplied with pressure medium by the hydraulic pump, a mechanical transmission that is combined with the hydrostatic transmission and has a clutch, and a control device configured to calibrate a grinding point which occurs when the clutch closes, from which time torque is configured to be transmitted via the clutch, the method comprising:
calibrating the grinding point as a function of the response of the expulsion volume or pressure medium volume flow of the hydraulic pump or the rotational speed of a hydraulic motor.

8. The method according to claim 7, wherein calibrating the grinding point as a function of the response of the expulsion volume or pressure medium volume flow of the hydraulic pump or the rotational speed of the hydraulic motor comprises:
continuously detecting and/or determining the expulsion volume or pressure medium volume flow of the hydraulic pump or the rotational speed of the hydraulic motor,
activating the clutch in the closing direction with a control signal starting value,
changing the control signal value in order to increase a closing force of the clutch,
aborting in the case of a control signal value at which a significant response is detected, and
storing this control signal value as a control signal value at the grinding point in the control device.

9. The method according to claim 8, wherein before changing the control signal value, the drive shaft of a second hydraulic motor is defined.

10. The method according to claim 8, wherein before changing the control signal value, the expulsion volume of the hydraulic motor is reduced.

11. The method according to claim 8, wherein changing the control signal value takes place continuously or incrementally.

12. The method according to claim 8, further comprising repeating the sequence according to claim 8 at least once, wherein before activating the clutch in the closing direction with the control signal starting value in the repeated sequence, the method further includes setting a new control signal starting value as a function of the most recently saved control signal value at the grinding point.

13. The method according to claim 12, wherein in setting the new control signal starting value as a function of the most recently saved control signal value at the grinding point, the new control signal starting value is calculated from the most recently saved control signal value at the grinding point reduced by one or more of:
the increment of the control signal value of the previous step sequence, or a fraction or a multiple thereof,
a hysteresis of the control signal value, and
a tolerance value.

14. The method according to claim 12, further comprising:
  determining a mean value from the saved control signal values at the grinding point.

15. The method according to claim 14, further comprising:
  determining control signal values at the grinding point which lie outside a specified bandwidth or a standard deviation, followed by one of:
    excluding control signal values at the grinding point from the mean value formation that lie outside the bandwidth or standard deviation, or
    rejecting the control signal values at the grinding point and repeating the method.

16. The transmission combination according to claim 1, wherein the transmission combination is for a traction drive.

\* \* \* \* \*